US008055237B2

(12) United States Patent
Jones et al.

(10) Patent No.: US 8,055,237 B2
(45) Date of Patent: Nov. 8, 2011

(54) USAGE MEASUREMENT COLLECTION AND ANALYSIS TO DYNAMICALLY REGULATE CUSTOMER NETWORK USAGE

(75) Inventors: D. Mark Jones, Ottawa (CA); Martin Labelle, Ottawa (CA); Edwin Gans, Ottawa (CA)

(73) Assignee: Bridgewater Systems Corp., Ottawa (CA)

( * ) Notice: Subject to any disclaimer, the term of this patent is extended or adjusted under 35 U.S.C. 154(b) by 763 days.

(21) Appl. No.: 12/186,831

(22) Filed: Aug. 6, 2008

(65) Prior Publication Data

US 2010/0035576 A1 Feb. 11, 2010

(51) Int. Cl.
*H04M 11/00* (2006.01)
(52) U.S. Cl. ........ 455/405; 455/406; 455/408; 379/111; 379/114.01; 379/114.17; 705/52; 380/231
(58) Field of Classification Search ............... 455/67.11, 455/405–408, 411, 412.1, 412.2, 414.1, 414.2, 455/414.3, 418–420, 423–425, 453, 466, 455/550.1, 556.2, 558; 705/51, 52; 379/111, 379/112.01, 112.04, 112.06, 112.07, 114.01, 379/114.15, 114.17; 380/227–234; 726/2, 726/6, 7
See application file for complete search history.

(56) References Cited

U.S. PATENT DOCUMENTS

| 7,046,680 | B1 | 5/2006 | McDysan et al. | |
|---|---|---|---|---|
| 7,280,818 | B2 * | 10/2007 | Clayton | 455/407 |
| 7,536,455 | B2 * | 5/2009 | Duffield et al. | 709/223 |
| 2003/0028631 | A1 | 2/2003 | Rhodes | |
| 2003/0050041 | A1 | 3/2003 | Wu | |
| 2003/0110252 | A1 | 6/2003 | Yang-Huffman | |
| 2004/0156489 | A1 * | 8/2004 | Vishik et al. | 379/102.03 |
| 2004/0203578 | A1 | 10/2004 | Toriyama | |
| 2006/0079228 | A1 | 4/2006 | Marsico et al. | |
| 2006/0090076 | A1 * | 4/2006 | De Cnodder et al. | 713/182 |
| 2006/0141984 | A1 | 6/2006 | Taglienti et al. | |
| 2006/0143028 | A1 | 6/2006 | Altmann et al. | |
| 2006/0276180 | A1 * | 12/2006 | Henry, Jr. | 455/412.2 |
| 2007/0016666 | A1 | 1/2007 | Duffield et al. | |
| 2008/0096524 | A1 * | 4/2008 | True et al. | 455/406 |
| 2009/0203352 | A1 * | 8/2009 | Fordon et al. | 455/406 |
| 2010/0022216 | A1 * | 1/2010 | Bandera et al. | 455/405 |
| 2011/0151831 | A1 * | 6/2011 | Pattabiraman | 455/405 |

FOREIGN PATENT DOCUMENTS

EP 1 119 944 B1 8/2001

OTHER PUBLICATIONS

Pias et al., "Securing the Internet Metering and Billing," *IEEE Global Telecommunications Conference*, 2:1603-1607 (Nov. 2002).
Internet Engineering Task Force; RFC2865—Remote Authentication Dial in User Service (RADIUS) (Jun. 2000).

(Continued)

*Primary Examiner* — Anthony Addy
(74) *Attorney, Agent, or Firm* — Sterne, Kessler, Goldstein & Fox P.L.L.C.

(57) ABSTRACT

In a network subscriber system, a method of determining how to monitor whether a subscriber's network usage exceeds a quota for the current billing period. The frequency at which the subscriber's usage data is collected and analyzed during the billing period is based upon the probability the subscriber's network usage exceeds the quota at a given point in time during the billing cycle. Usage data is collected more frequently as the probability increases. Usage analysis is performed if the probability exceeds a threshold.

28 Claims, 10 Drawing Sheets

OTHER PUBLICATIONS

Internet Engineering Task Force; RFC2866—RADIUS Accounting (Jun. 2000).
Internet Engineering Task Force; RFC3588—Diameter Base Protocol (Sep. 2003).
Internet Engineering Task Force; RFC4072—Diameter Extensible Authentication Protocol (EAP) Application (Aug. 2005).
Pias et al., "Securing the Internet Metering and Billing," *IEEE Global Telecommunications Conference*, 2:1603-1607 (Nov. 2002).
Notification concerning Transmittal of International Preliminary Report on Patentability for International Application No. PCT/IB2009/005370, mailed Feb. 17, 2001, 6 pages.

* cited by examiner

USAGE MEASUREMENT COLLECTION AND ANALYSIS TO DYNAMICALLY REGULATE CUSTOMER NETWORK USAGE

BACKGROUND OF THE INVENTION

1. Field of the Invention

The present invention relates to usage measurement collection and analysis within communications networks.

2. Background of Invention

An increasingly large number of individuals use portable computing devices, such as laptop computers, personal data assistants (PDAs), smart phones and the like, to support mobile communications. The number of computing devices, and the number of networks that these devices connect to, has increased dramatically in recent years. Similarly, an increasing number of wireless Internet access services have been appearing in airports, cafes and book stores.

Typically users gain access to these networks by purchasing a subscription plan from a service provider. One type of subscription plan is a flat rate subscription plan. In a flat rate subscription plan a subscriber pays a fee for a billing cycle and is entitled to a set amount of network usage (i.e., a usage quota) during the billing cycle. For example, a user may pay $30 for a month and be entitled to 500 minutes of network time. The usage quota can be specified as a time per billing cycle amount (e.g., 500 minutes per month) or as a data volume per billing cycle amount (e.g., 1000 kBytes per month). In some flat rate subscription plans the usage quota is unlimited.

Another type of usage plan is an actual usage subscription plan. In an actual usage subscription plan a subscriber pays a set rate based on the actual amount of network usage during a billing cycle. For example, a user may pay $1 per minute of network usage. Actual usage plans can have incentives/penalties based on a subscriber's usage during a billing cycle. For example, in a subscription plan a subscriber may pay $1 per minute for the first 500 minutes and $2 per minute for every minute beyond 500 minutes during the billing cycle. Subscription plans can combine aspects of flat rate plans and usage plans. For example, a subscriber may pay $30 per month for 500 minutes of network usage and $1 per minute for every minute used after 500 minutes.

In the plans described above, as well as other subscriber plans, it is useful to police a subscriber's usage against one or more quotas. Usage collection and usage analysis are required steps in policing a subscriber's network usage against one or more usage quotas. Usage collection involves collecting raw usage metrics from network devices. Usage collection can occur periodically throughout a billing cycle (e.g., collect data every week). Raw data is aggregated to calculate usage totals during the subscriber's billing period. Usage analysis involves evaluating a subscriber usage total against a usage quota specified by a subscription plan to determine if the usage quota was breached. If the quota is breached, the service provider applies policy enforcement according to the subscription plan. For example, the service provider may send a message to the subscriber, redirect traffic, terminate the session, or generate a billing record.

Usage collection generates large volumes of data putting loads on both network devices and metering nodes. Thus, this data is expensive to collect. This data is of low value to the service provider if it does not identify a quota breach. Further, usage analysis is expensive to compute and is an intensive input/output operation that does not result in identifying a quota breach in the vast majority (approximately 98% or greater) of evaluations. Typically, the rate of usage quota breaches is very low, because only a small percentage of subscribers (approximately less than 5%) have usage patterns which breach usage quotas during their billing period. Further, the majority of usage quotas are breached during the last few days of a subscribers billing period while evaluations occur throughout the billing cycle.

RADIUS and Diameter protocols are frequently used to gather usage metrics. For further information regarding RADIUS and Diameter protocols, see, e.g., "RFC 2865: Remote Authentication Dial In User Service (RADIUS)," "RFC 4072: Diameter Extensible Authentication Protocol (EAP) Application," "RFC 2866: RADIUS Accounting," and "RFC 3588, Diameter Base Protocol," all of which are by the Internet Engineering Task Force ("IETF"), the disclosure of all of which are hereby incorporated by reference.

A typical Authentication, Authorization and Accounting ("AAA") transaction consists of the following exchanges: an Access-Request message including subscriber id and credentials, an Access-Accept message including authorized session parameters, Accounting-Interim messages containing cumulative usage metrics for a pre-determined collection interval, and an Accounting-Stop message containing final usage metrics for the session. The Access-Request message will typically result in a database lookup to validate subscriber credentials and to retrieve service profiles. The Access-Accept message can contain an Interim Interval which instructs the node when to send interim usage updates. The Access-Accept message can also contain a Class attribute which contains an opaque octet string that the node will echo back in every usage update (Interim and Final).

The previous method of calculating an interim interval for gathering customer network usage measurement updates only at Access-Request time is not suitable for long lived sessions because the usage breach probability typically increases over the subscriber's billing period.

What are needed are cost effective systems and methods for usage measurement collection and analysis based on the probability that a user will breach the user's quota for allowed network services. Further, these systems and methods should be able to operate within the RADIUS and Diameter protocols.

SUMMARY OF THE INVENTION

Embodiments of the present invention provide systems and methods that improve usage measurement collection and usage measurement analysis operations. Subscriber characteristics are used to calculate the probability of a quota breach at a given time and usage collection intervals are adapted to eliminate the usage analysis step when the usage breach probability is judged to be too low. The present invention proposes several methods for determining the usage breach probability. The present invention significantly increases the capacity of a usage metering system. That is, the present invention increases the number of metered subscribers that can be supported by a given system (network devices and metering node).

In an embodiment, the usage breach probability is calculated using a formula containing (a) values known at the time a session begins (e.g., billing date, repeat offender status, threshold values) and/or (b) values known at the time of interim/final usage collections (e.g., session duration, cumulative usage). The usage breach probability can be updated when the usage update is received by the metering node. There are a variety of approaches in which the usage breach probability may be determined, including but not limited to heuristics, regression, other statistical and data mining approaches, as well as rules of thumb. In embodiments, the approach and/or formula to calculate the usage breach probability can be specific to the class of customer (e.g., premium versus standard customer packages), specific to individual customers or common to all customers. Through analysis of historical data patterns and use of statistical methods, confidence measures can be assigned to the method or formula to be used to generate the usage breach probability, such that the confidence measure gives an indication of the approach likely to provide the most accurate estimate of a breach probability.

In embodiments, both dynamic and static subscriber characteristics relative to a current usage session can be used. An example of a static characteristic includes, for example, the number of previous usage breaches by a customer. Dynamic characteristics can be dynamic relative to the start of a usage session or relative to the usage session generally. An example of a dynamic characteristic relative to the start of a usage session is the type of service requested. An example of a dynamic characteristic relative to the usage session is the total amount of usage.

In a further embodiment, a subscriber characteristic used in usage breach probability calculations includes a subscriber's billing date. The probability of a quota breach increases towards the end of the billing period. For example, usage analysis could be skipped for the first five (5) days of a monthly billing interval.

In a further embodiment, a subscriber characteristic used in usage breach probability calculations includes the number of previous quota breaches. The probability of a "repeat-offender" subscriber hitting a quota is significantly higher than the general subscriber population.

In a further embodiment, a subscriber characteristic used in usage breach probability calculations includes knowledge of when previous quota breaches occurred (e.g., how many days into the billing period).

In a further embodiment, a subscriber characteristic used in usage breach probability calculations includes knowledge of peak usage patterns (e.g., on-peak/off-peak, weekdays).

In a further embodiment, the present invention is used within the RADIUS and Diameter protocols.

In a further embodiment, when the present invention is used within the RADIUS and Diameter protocols, an evaluation of the usage breach probability is made at Access-Request time and the result of this evaluation can be returned in a session state attribute (e.g., RADIUS Class attribute) to avoid database lookups at each and every usage collection time. The session state attribute can be returned in the Access-Accept message, in subsequent Accounting-Interim, or in Accounting-Stop messages. The probability can also be used to determine an appropriate interim usage collection interval which would be communicated to the network device in the appropriate attribute (e.g., RADIUS: Acct-Interim-Interval AVP ("attribute value pair") and Diameter: Accounting-Interim-Interval AVP).

In a further embodiment of the present invention, the breach quota probability is stored in the Class AVP as a formula containing (a) values determined at Access-Request time and/or (b) values determined on interim/final usage collection. The probability can be updated when the usage update is received by the metering node.

In a further embodiment, the present invention can use a Session Time AVP in the Access-Accept message to trigger a session re-authorization. When the Access-Request for re-authorization is received by the metering node, a new probability and/or interim interval calculation is performed.

In a further embodiment, the present invention can provide a probability expiry time window with the usage breach probability in the Class AVP. When the interim usage in received, the probability expiry time is checked and if it has expired, a new usage breach probability, new validity time window and potentially new interim interval are calculated. A Change of Authorization (CoA) message is used to communicate the new values.

In a further embodiment, the present invention can combine RADIUS and Diameter embodiments depending on network device capabilities.

It is an objective of the present invention that it may be incorporated into any product that includes a usage metering function.

Further embodiments, features, and advantages of the invention, as well as the structure and operation of the various embodiments of the invention are described in detail below with reference to accompanying present drawings.

BRIEF DESCRIPTION OF THE FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
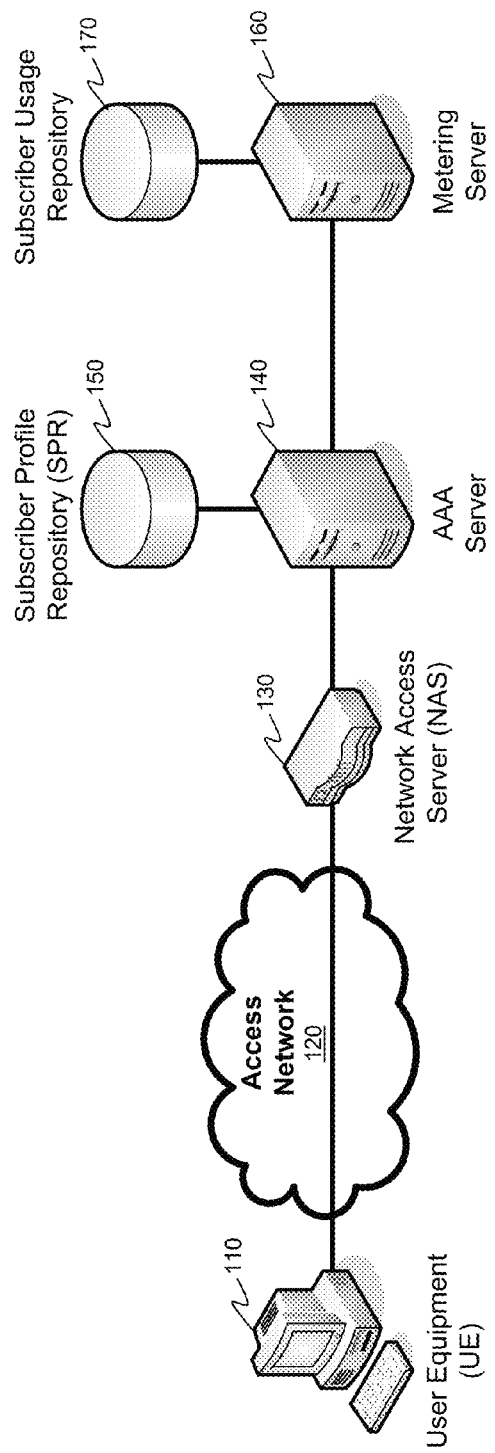
FIG. 1 provides a general subscriber network diagram.

FIG. 1 provides architecture 100 of a subscriber network. Architecture 100 includes user equipment 110, access network 120, network access server (NAS) 130, AAA server 140, subscriber profile repository (SPR) 150, metering server 160, and subscriber usage repository 170. Architecture 100 provides a very simplified diagram of a subscriber network to illustrate the concepts of subscriber usage and the needs for usage collection and usage evaluation. As will be known by individuals skilled in the relevant arts, the present invention can be used in any type of metering application in wireless or wireline networks, or networks combining both wireless and wireline network elements.

User equipment 110 is any device that provides a user access to various networks. User equipment 110 can include, but is not limited to, a laptop computer, a cellular phone, a smart phone, a PDA, other wireless mobile devices, or wired network device. Access network 120 represent networks that may require a user of user equipment 110 to have a subscription before a user is granted accessed. Access network can be a wireline or a wireless network. Network access server (NAS) 130 is the point of access for user equipment 110. AAA server 140 performs authentication, authorization and accounting functions. It should be noted that authentication, authorization and accounting functions can be split across two or more servers (e.g., authentication/authorization server and accounting server). Subscriber profile repository (SPR) 150 stores user credentials and profiles that are used by AAA server 140 to perform AAA functions. Metering server 160 performs usage collection and usage analysis functions. Subscriber usage repository 170 stores user usage data. It should be noted that AAA and metering functions can be deployed on a single physical node. Further, SPR 150 and subscriber usage repository 170 can be deployed on a single physical database.

In some embodiments, the methods of the present invention are described in terms of a typical AAA transaction in the RADIUS and Diameter protocols. These descriptions are for exemplary purposes only and are not intended to be limiting. As would be appreciated by one of ordinary skill in the art, the present invention is applicable to any subscriber metering applications.

Referring to FIG. 1, when user equipment 110 attaches to the access network 120, network access server 130 needs to authenticate with AAA server 140 before network access is granted. The subscriber provides credentials to network access server 130. The network access server 130 forwards the credentials to AAA server 140. The credential validation may involve EAP (Extensible Authentication Protocol). The transport between network access server 130 and AAA server 140 is typically carried over AAA transactions using RADIUS or Diameter protocols. The AAA messages may travel through a visited AAA server (not shown), zero or more broker AAA server(s) (not shown), before finally arriving at the AAA server 140. The accounting function can include a subscriber profile repository 150 that stores user credentials and profiles.

Figure 2:
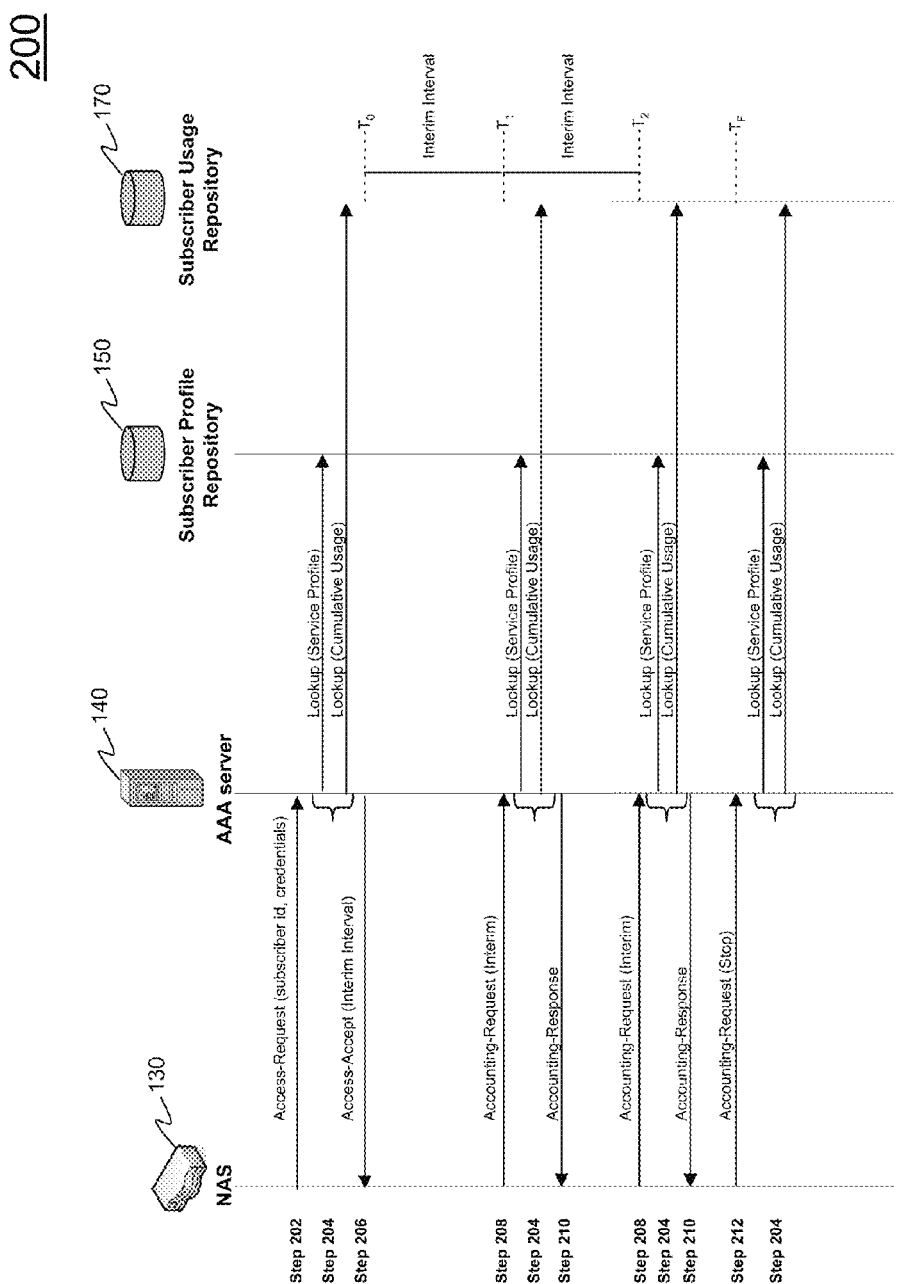
FIG. 2 provides a prior art method for policing a subscriber's network usage against a usage quota using RADIUS or Diameter protocol.

FIG. 2 illustrates the conventional approach to policing a subscriber's network usage against a usage quota using RADIUS or Diameter protocol. Method 200 starts at step 202.

In step 202, AAA server 140 receives an access request message from network access server 130. An access request message indicates that the user of user equipment 110 would like a usage session to be authorized. Access request message includes a subscriber identifier (e.g., johnsmith@realm) and subscriber credentials (e.g., a password).

In step 204, AAA server 140 looks up the subscriber's service profile from subscriber profile repository 150 to validate the subscriber credentials and retrieve the subscriber's usage quota. AAA server 140 also looks up the cumulative total of the subscriber's usage for the current billing cycle from subscriber usage repository 170. The cumulative total is compared to the usage quota to determine if the subscriber has exceeded his or her usage quota for the current billing cycle. If the subscriber credentials are valid and the subscriber has not exceeded his or her usage quota, a session is authorized.

In step 206, once the session is authorized, user equipment 110 receives an access accept message. This allows the user of the network device to begin a session. The access accept message includes an interim interval. During the session, network access server 130 tracks the bytes sent and received by user equipment 110. The interim interval tells the network access server 130 the frequency at which it is to send usage data to AAA server 140 during the session (e.g., every hour during the session). In conventional systems, the interim interval is static throughout the session.

In step 208, at time $T_1$, the first interim interval occurs and network access server 130 sends an accounting request interim message that includes a usage update from user equipment 110 to AAA server 140. AAA server 140 updates the cumulative usage total and compares the cumulative usage total to the usage quota as described in step 204.

In step 210, AAA server 140 sends a accounting response to network access server 130 according to the results of the comparison of the usage quota and the cumulative usage total.

At time $T_2$, the second interim interval occurs and network access server 130 sends an accounting request interim message and the cumulative usage total is updated as described in step 208. Further, the cumulative usage total is again compared to the usage quota as described in step 204 and an accounting response is sent as described in step 210.

Steps 208, 204, and 210 are repeated throughout the session as interim intervals occur.

In step 212, in response to a subscriber ending the session, network access server 130 sends an accounting request stop message that includes a final usage update that is analyzed by AAA server 140 according to step 204.

It should be appreciated from FIG. 2 that the interim interval does not change during the session regardless of the usage updates and AAA server 140 analyzes subscriber usage data every time a usage update is received.

Figure 3:
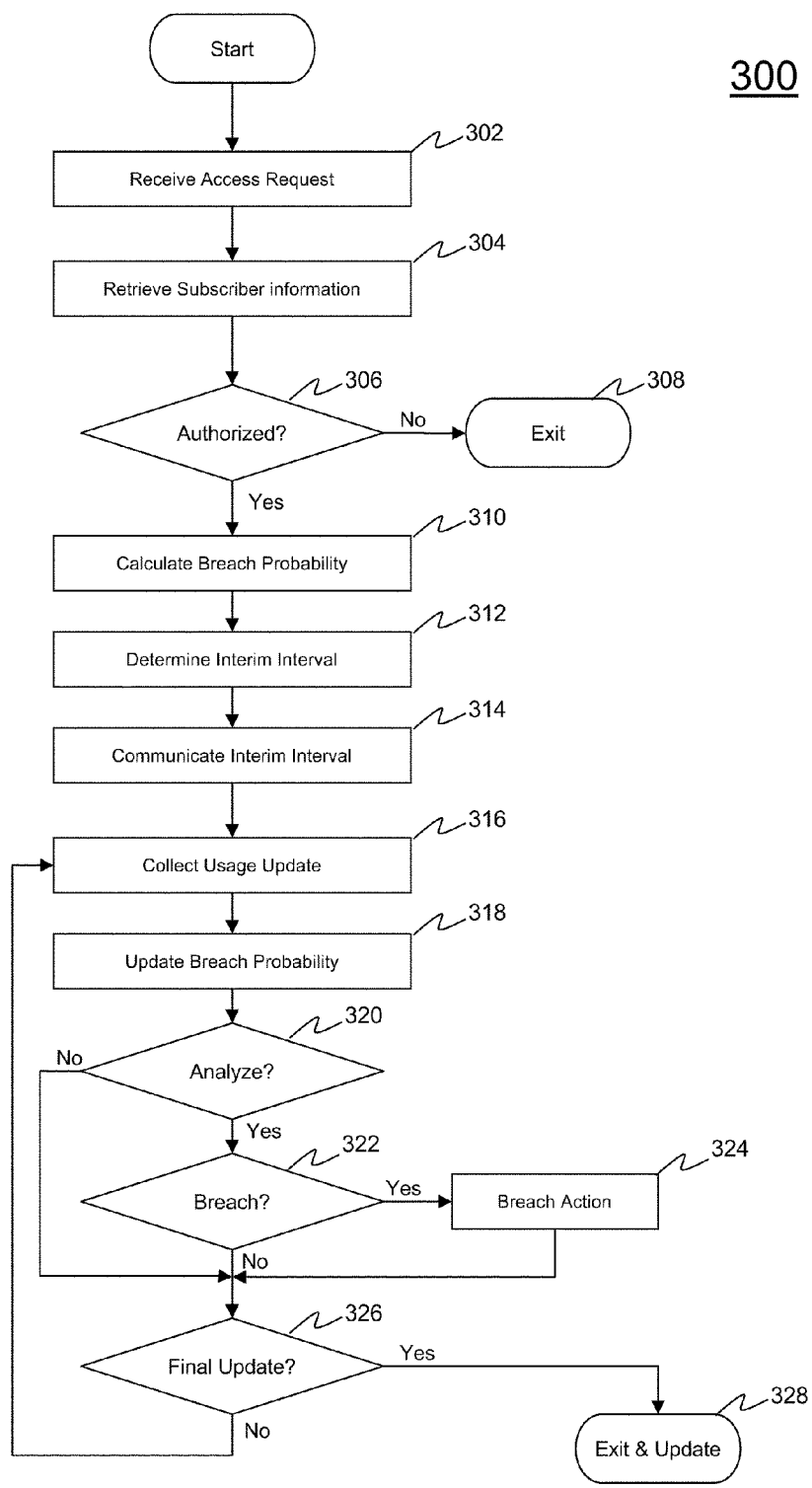
FIG. 3 provides a method for policing a subscriber's usage in accordance with an embodiment of the present invention.

FIG. 3 provides a method 300 that optimizes usage data collection and usage data analysis in accordance with the present invention. Method 300 starts at step 302.

In step 302, an access request is received indicating that a subscriber would like a usage session to be authorized.

In step 304, the subscriber credentials and services profiles are retrieved. Step 304 may involve retrieving information from a database. In method 300, service profiles can contain more detailed information about subscribers than conventional service profiles. In addition to containing subscriber's usage quota for the current billing cycle, service profiles can also contain information that allows a probability that the subscriber will breach his or her usage quota during the current session to be calculated. This will be described in greater detail with respect to step 310.

In step 306, a determination is made whether access is authorized. That is, the subscriber credentials are checked to see if they are valid and a determination is made as to whether the subscriber has exceeded his or her usage quota. If access is not authorized, method 300 continues to step 308. If access is authorized, method 300 continues to step 310.

In step 308, the subscriber is denied access and method 300 exits. Step 308 can include sending the subscriber a message indicating why the session was not authorized.

In step 310, a session has been authorized and a usage breach probability is calculated. The usage breach probability represents the probability that the subscriber will breach his or her usage quota during the session. The usage breach probability can be based on any information and network usage statistics available at the time the session begins. For example, usage breach probability can be based on, but not limited to, the following information and network usage statistics: the current date, the billing date, the number of breaches for the subscriber, the number of breaches for all subscribers, when breaches have occurred in the past for the subscriber, when breaches have occurred for all subscribers, knowledge of peak usage patterns (e.g., on-peak/off-peak, weekdays), cumulative usage for the subscriber, and usage quota for the subscriber. Further, the following rules can be used to determine the usage breach probability: the probability of a quota breach increases towards the end of the billing period, the probability of a "repeat-offender" subscriber breaching a quota is significantly higher than the general subscriber population, a subscriber is more likely to breach at a time in the billing cycle when historic breaches have occurred, and breaches are more likely to occur at peak usage periods.

In step 312, the calculated usage breach probability is used to determine the interim interval for the session, in that a higher usage breach probability would be associated with a shorter interim interval. Further, in an embodiment where there are multiple subscribers, each with active sessions occurring simultaneously, the usage breach probability of the subscriber can be compared to the usage breach probability of other subscribers with active sessions to determine the interim interval for the subscriber. This allows resources to be optimized by using resources to monitor the subscribers most likely to breach.

In step 314, an access accept message indicating the interim interval is communicated.

In step 316, a usage update is collected. This usage update is collected when the interim interval has elapsed or because the subscriber has ended the session.

In step 318, the usage breach probability is updated based on information received in the usage update. That is, the usage breach probability can be increased or decreased based on information contained in the usage update. For example, if the amount of usage in the current session is sufficiently high, the usage breach probability may increase.

In step 320, a determination as to the degree the usage data should be analyzed is made. The degree to which the usage data should be analyzed is based on the updated usage breach probability. For example, a new cumulative usage total may be calculated if the usage breach probability exceeds a first threshold and the new cumulative usage total may be evaluated against the subscriber's usage quota if the usage breach probability exceeds a second threshold. Further, in an embodiment where there are multiple subscribers, each with active sessions occurring simultaneously, the usage breach probability of the subscriber can be compared to the usage breach probability of other subscribers with active sessions to optimize the level of analysis for all subscribers. In an exemplary embodiment, data is aggregated at step 320 and a determination is made whether the cumulative usage total should be evaluated against the usage quota. If it is determined that an evaluation should take place, method 300 continues to step 322. If it is determined that an evaluation is not necessary, method 300 continues to step 326.

In step 322, the cumulative usage total is evaluated against the subscriber's usage quota and a determination is made as to whether a usage breach has occurred. In some instances, this may involve retrieving the usage quota from a database. If a breach has occurred method 300 continues to step 324. If a breach has not occurred, method 300 continues to step 326.

In step 324, after it is determined that a breach has occurred, the appropriate breach action occurs. For example, a message can be sent to the subscriber indicating the breach (e.g., SMS), subscriber traffic can be redirected, the subscriber's session can terminate, a billing record may be generated, or any combination of the above actions can be performed. Further, the subscriber's service profile can be updated accordingly.

In step 326, a determination is made as to whether the update is a final update. If the update is a final update, method 300 continues to step 328. If the update is not a final update, method 300 continues to step 316.

In step 328, a subscriber session is ended and information in the subscriber's service profile is updated accordingly.

Figure 4:
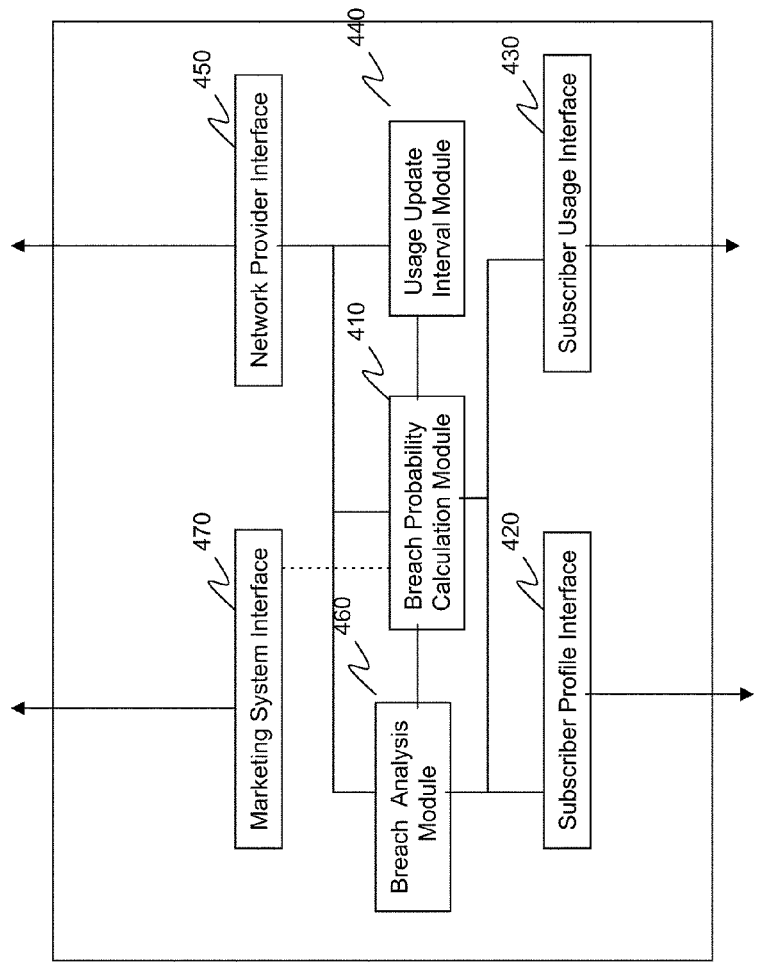
FIG. 4 provides an illustration of a usage policing system in accordance with an embodiment of the present invention.

FIG. 4 illustrates a usage policing system 400, in accordance with an embodiment of the present invention. In an exemplary embodiment, a usage policing system 400 includes a breach probability calculation module 410, a subscriber profile interface 420, a subscriber usage interface 430, a usage update interval module 440, a network provider interface 450, a breach analysis module 460, and a marketing system interface 470.

The breach probability calculation module 410 computes the usage breach probability in the manner described above, namely the calculations are based on any information and network usage statistics available at the time of the calculation. Such information and network usage statistics includes both static and dynamic information. Such information includes, but is not limited to, the current date, the billing date, the number of breaches for the subscriber, the number of breaches for all subscribers, when breaches have occurred in the past for the subscriber, when breaches have occurred for all subscribers, knowledge of peak usage patterns (e.g., on-peak/off-peak, weekdays), cumulative usage for the subscriber, and usage quota for the subscriber.

A subscriber profile interface 420 obtains subscriber profile data from an outside source, e.g., a subscriber profile repository 150, and makes it available to the breach probability calculation module 410 and the breach analysis module 460. Similarly, a subscriber usage interface 430 obtains usage data from an outside source, e.g., a subscriber usage repository 170, and makes it available to the breach probability calculation module 410 and the breach analysis module 460. Unlike the situation in the conventional approach where the interim interval is fixed, the usage update interval module 440 updates the initial interim interval, based on the current value of the usage breach probability. Such dynamic adjustment represents one of the innovative contributions of a number of embodiments of the current invention. In one class of exemplary embodiments, the dynamic adjustment relies on dynamic factors (i.e., those factors that vary at the start of a session or during a particular session), rather than a reliance on static factors (i.e., those factors whose values do not varying during a particular session).

Network provider interface 450 provides a coupling between the usage policing system 400 and the rest of the network provider equipment. In various embodiments, the coupling supports communication to network provider equipment via RADIUS, Diameter or a mixed set of protocols. The coupling also optionally supports, for example, connectivity to an external user interface such that the network provider can provide various inputs (e.g., selection of different types of rules of usage breach probability calculation, or selection of different inputs to the usage update interval function) for input to the breach probability calculation module 410, breach analysis module 460, and usage update interval module 440.

The breach analysis module 460 is used to analyze dynamic changes in the data to determine whether the breach probability has exceeded one or more thresholds that will trigger a network response. For example, one threshold may be a marketing threshold. When the breach probability exceeds a marketing threshold, breach analysis module 460 provides a marketing threshold exceeded indication to the marketing system interface 470. The breach analysis module 460 is also used to capture the subscriber information at the time of an actual breach. This information can then be stored for future use, such that the calculation of a breach probability can be increasingly more accurate.

Optionally, a marketing system interface 470 is also included, which provides a marketing message when it receives an marketing threshold exceeded indication. The marketing message is then transmitted to a marketing system that may be external to generate a marketing email that notifies the customer that they may soon exceed their usage quota, and provide a means for the customer to purchase more bandwidth or expand their service capabilities.

In a typical scenario, the usage policing system 400 operates as follows. An access request is received via the network provider interface 450 indicating that a subscriber would like a usage session to be authorized. The subscriber credentials and services profiles are retrieved via the subscriber profile interface 420 and subscriber usage interface 430. As noted above, the service profiles can contain more detailed information about subscribers than conventional service profiles. In addition to containing subscriber's usage quota for the current billing cycle, service profiles can also contain information that allows a probability that the subscriber will breach his or her usage quota during the current session to be calculated.

External to the usage policing system 400, a determination is made whether access is authorized. That is, the subscriber credentials are checked to see if they are valid and a determination is made as to whether the subscriber has exceeded his or her usage quota. If access is not authorized, the subscriber is denied access, with possibility a message being forwarded to the subscriber as to the reason for the denial of access.

Upon the authorization of a session, a usage breach probability is calculated by the breach probability calculation module 410. The usage breach probability represents the probability that the subscriber will breach his or her usage quota during the session. The usage breach probability can be based on any information and network usage statistics available at the time the session begins. For example, usage breach probability can be based on, but not limited to, the following information and network usage statistics: the current date, the billing date, the number of breaches for the subscriber, the number of breaches for all subscribers, when breaches have occurred in the past for the subscriber, when breaches have occurred for all subscribers, knowledge of peak usage patterns (e.g., on-peak/off-peak, weekdays), cumulative usage for the subscriber, and usage quota for the subscriber. Further, the following rules can be used to determine the usage breach probability: the probability of a quota breach increases towards the end of the billing period, the probability of a "repeat-offender" subscriber breaching a quota is significantly higher than the general subscriber population, a subscriber is more likely to breach at a time in the billing cycle when historic breaches have occurred, and breaches are more likely to occur at peak usage periods.

The calculated usage breach probability is used by the usage update interval module 440 to determine the interim interval for the session, in that a higher usage breach probability would be associated with a shorter interim interval. Further, in an embodiment where there are multiple subscribers, each with active sessions occurring simultaneously, the usage breach probability of the subscriber can be compared to the usage breach probability of other subscribers with active sessions to determine the interim interval for the subscriber. This allows resources to be optimized by using resources to monitor the subscribers most likely to breach. The interim interval is communicated externally via the network provider interface 450.

Upon the lapse of the interim interval, or an end of the subscriber session, a usage update is collected and input to the breach probability calculation module 410. The breach probability calculation module 410 updates the calculation of the usage breach probability, using the information contained in the usage update. As noted above, if the amount of usage in the current session is sufficiently high, the usage breach probability may increase.

The breach analysis module 460 also determines the degree the usage data should be analyzed. The degree to which the usage data should be analyzed is based on the updated usage breach probability. For example, a new cumulative usage total may be calculated if the usage breach probability exceeds a first threshold and the new cumulative usage total may be evaluated against the subscriber's usage quota if the usage breach probability exceeds a second threshold. Further, in an embodiment where there are multiple subscribers, each with active sessions occurring simultaneously, the usage breach probability of the subscriber can be compared to the usage breach probability of other subscribers with active sessions to optimize the level of analysis for all subscribers.

Should the second threshold be exceeded, the cumulative usage total is evaluated against the subscriber's usage quota by the breach analysis module 460 and a determination is made as to whether a usage breach has occurred. If a breach has occurred, the appropriate breach action occurs. For example, a message can be sent to the subscriber indicating the breach (e.g., SMS), subscriber traffic can be redirected, the subscriber's session can terminate, a billing record may be generated, or any combination of the above actions can be performed. Further, the subscriber's service profile can be updated accordingly.

If a breach has not occurred, a determination is made by the breach analysis module 460 as to whether the update is a final update, as would be the case when a subscriber seeks to end a session. In the case of a final update, a subscriber session is ended and information in the subscriber's service profile is updated accordingly.

In a further embodiment of the current invention, the usage policing system 400 may optionally generate a marketing response based on the analysis of the subscriber information available. For example, a subscriber who initiates a request to view a video would be notified of the likelihood of an upcoming usage breach such that the subscriber could obtain additional usage quota to support the video request. Such a marketing notification would be based on a current usage breach probability, and preferably would precede a usage breach event by sufficient time so as to add to the growth of the subscriber-network provider relationship. Such a capability is embodied in the marketing system interface 170, whose coupling to the breach probability calculation module 410 provides the current usage breach probability to the marketing system interface 170. When the current usage breach probability exceeds a marketing threshold, a marketing message may be initiated by the marketing system interface 170 as described above.

As described earlier, the ability to optimize usage collection and analysis takes advantage of the statistical correlation between various types of information and the usage breach probability of a particular subscriber. The statistical correlation can be captured in a variety of functional relationships. For example, if the three breach factors of day-of-week (designated as breach factor f1), cumulative-usage (f2), and usage-quota (f3) were particularly informative as to the likelihood of a subsequent breach, a possible relationship may be captured as follows:

$$\text{Usage breach probability} = A*f1 + B*f2 + C*f3$$

where A, B, and C are coefficients that have been developed so as to maximize the accuracy of the usage breach probability calculation. Various means may be used to determine these coefficients, including regression analysis. Moreover, the scope of this approach is not limited to linear relationships, but encompasses non-linear relationships, discrete relationships, and time-varying relationships. Similar relationships can also be developed for the interim interval, that can found to depend on such factors as usage breach probability and actual overall usage.

In a further embodiment of the current invention, as the usage breach probability analytical models proliferate, a network provider may be presented (optionally via a user interface) with a wide variety of suitable predictive models for the optimal collection and analysis of usage data. In terms of subscribers, predictive functional relationships may be determined for individual subscribers, for classes of subscribers (e.g. premium subscribers). Default formulae may be provided for use by network providers (for use in situations where no better formulae is available). Recommended formulae may also be offered for use in well defined situations. In order for a network provider to make choices between default formulae, recommended formulae, or customized formulae that may have been developed by the network provider for its unique situations, a confidence level may be attached to each of the formulae to assist in making a choice.

Figure 5:
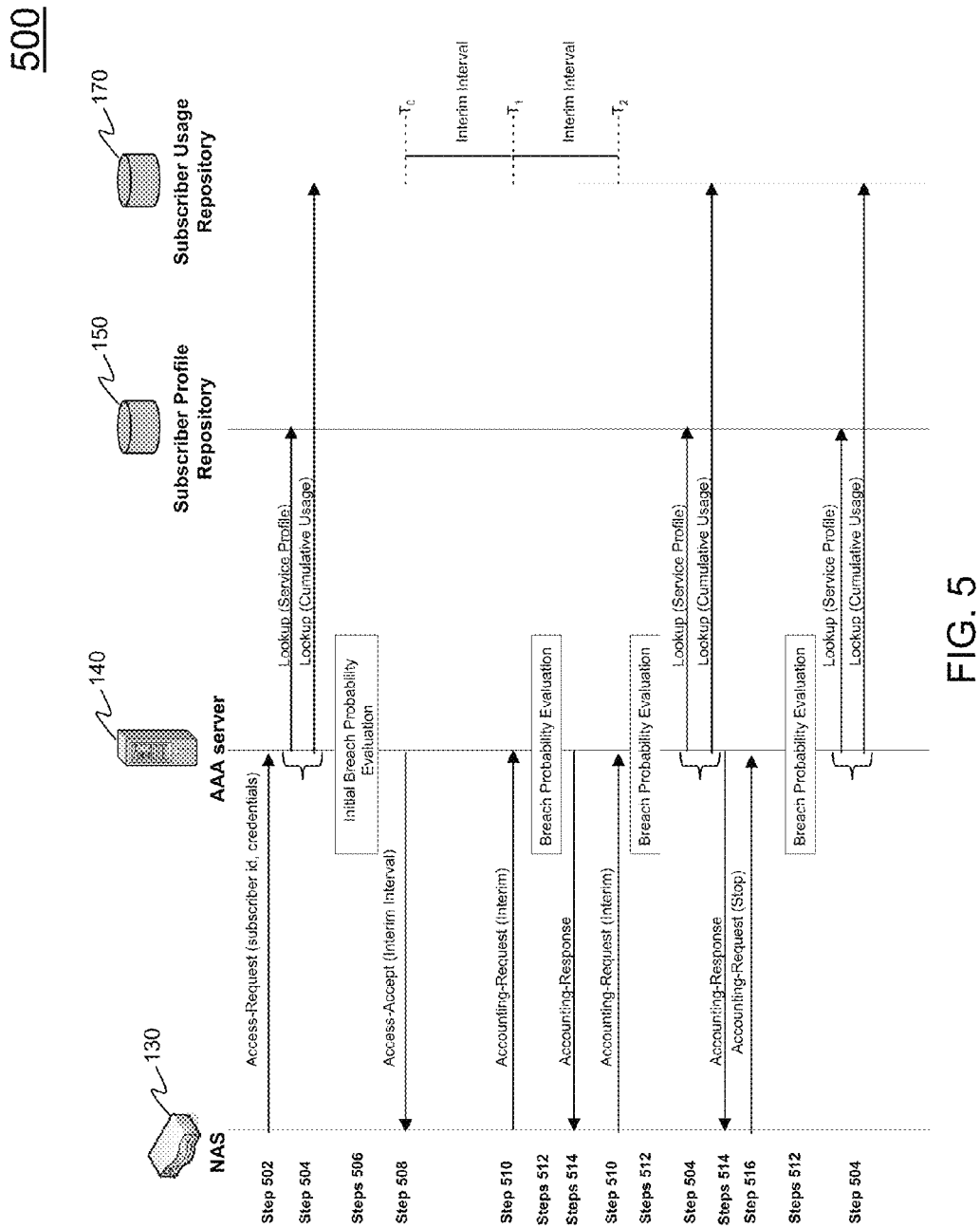
FIG. 5 provides an illustration of an embodiment of the present invention wherein the method provided in FIG. 3 is used within the RADIUS or Diameter protocol.

FIG. 5 provides an exemplary method 500 illustrating the general method 300 performed within the context of RADIUS or Diameter protocols. Reference is made to FIG. 2 for a general description of RADIUS or Diameter protocol implementations. The advantages of implementing method 300 in a RADIUS or Diameter protocol environment can be appreciated by comparing FIG. 5 to FIG. 2.

In step 502, AAA server 140 receives an access request message from network access server 130.

In step 504, AAA server 140 looks up the subscriber's service profile from subscriber profile repository 150 to validate the subscriber credentials and retrieve the subscriber's usage quota. AAA server 140 also looks up the cumulative total of the subscriber's usage for the current billing cycle from subscriber usage repository 170. The cumulative total is compared to the usage quota to determine if the subscriber has exceeded his or her usage quota for the current billing cycle. If the subscriber credentials are valid and the subscriber has not exceeded his or her usage quota, a session is authorized.

In step 506, AAA server 140 calculates the initial usage breach probability as described in step 310 of method 300.

In step 508, once the session is authorized, user equipment 110 receives an access accept message. The access accept message includes an interim interval. The interim interval is based on the usage breach probability as described in step 312 of method 300.

In step 510, at time $T_1$, the first interim interval occurs and network access server 130 sends an accounting request interim message that includes a usage update from user equipment 110 to AAA server 140.

In step 512, a usage breach probability evaluation occurs according to steps 318 and 320 of method 300. As shown after the evaluation, step 504 is not performed. This is because the usage breach probability indicates that the likelihood of a breach is low and usage data should not be analyzed according to step 320 of method 300.

In step 514, AAA server 140 sends an accounting response to network access server 130 based on the usage breach probability evaluation.

At time $T_2$, the second interim interval occurs and network access server 130 sends an accounting request interim message as described in step 510. Further, a breach evaluation is performed as described in step 512. However, in contrast to the previous breach evaluation, lookups of step 504 are performed. This is because the usage breach probability is now high enough that the lookups should be performed. Again, an accounting response is sent according to step 514.

Steps 510, 512, and 514 are repeated throughout the session as interim intervals occur. However, step 504 is performed only when the usage breach probability evaluation indicates it is necessary.

In step 516, in response to a subscriber ending the session, network access server 130 sends an accounting request stop message that includes a final usage update that is analyzed by AAA server 140 according to step 512.

As shown in FIG. 5, an evaluation of the quota usage breach probability is made at Access-Request time. The breach quota probability evaluation can be stored in the Class AVP as a formula containing (a) values determined at Access-Request time and/or (b) values determined on interim/final usage collection. The result of this evaluation can be returned in a session state attribute (e.g., Attribute-Value Pair (AVP)). As illustrated in FIG. 5, the probability can be used to determine an appropriate interim usage collection interval and to avoid database lookups at each usage collection time.

Figure 6:
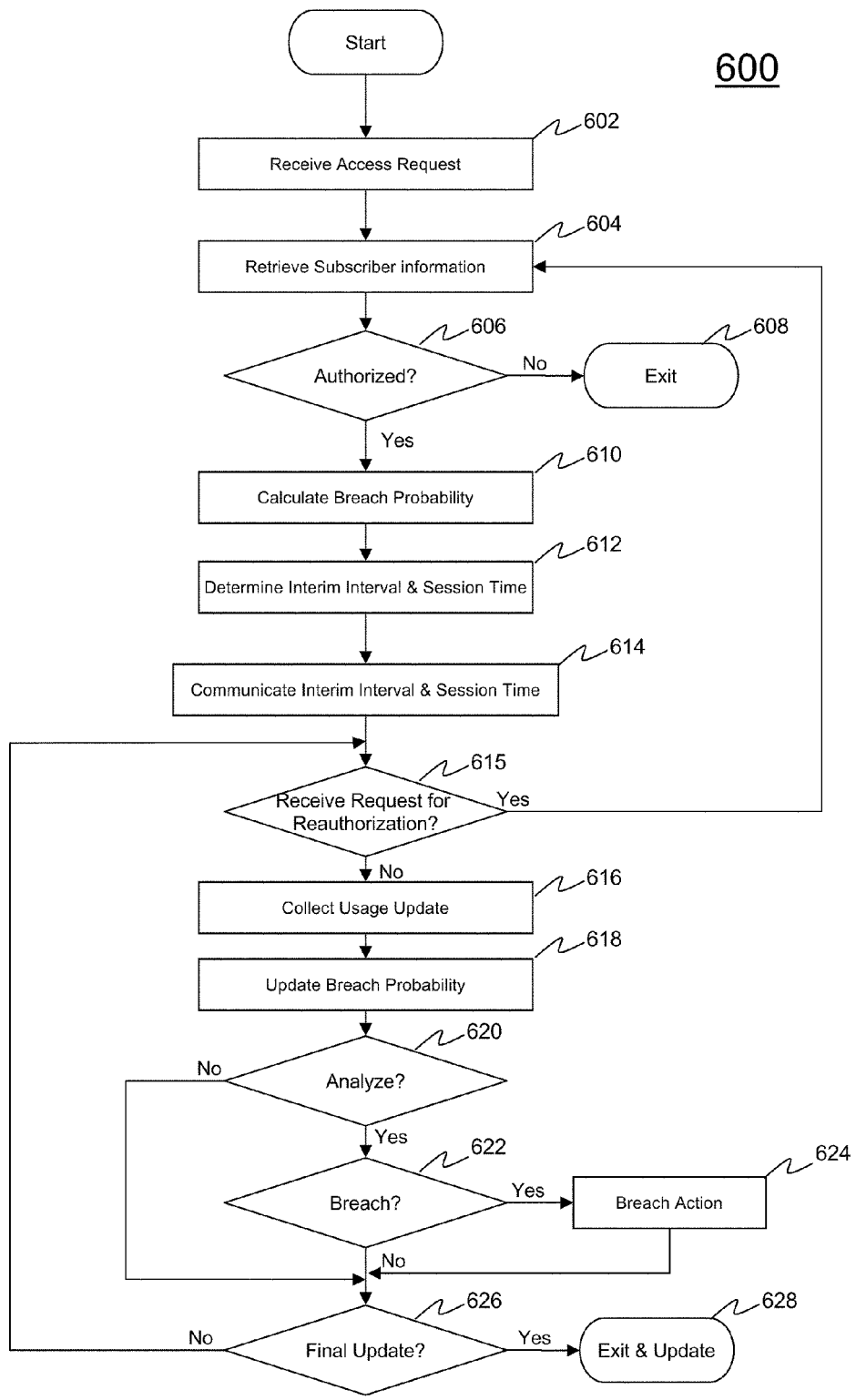
FIG. 6 provides a method for policing a subscriber's usage in accordance with the present invention.

FIG. 6 provides a method 600 that optimizes usage data collection and usage data analysis in accordance with an embodiment of the present invention. Method 600 starts at step 602.

In step 602, an access request is received indicating that a subscriber would like a usage session to be authorized.

In step 604, the subscriber credentials and services profiles are retrieved. Step 604 may involve retrieving information from a database. In method 600, service profiles can contain more detailed information about subscribers than conventional service profiles. In addition to containing subscriber's usage quota for the current billing cycle, service profiles contain information that allow a probability that the subscriber will breach his or her usage quota during the current session to be calculated. This will be described in greater detail with respect to step 610.

In step 606, a determination is made whether access is authorized. That is, the subscriber credentials are checked to see if they are valid and a determination is made as to whether the subscriber has exceeded his or her usage quota. If access is not authorized, method 600 continues to step 608. If access is authorized, method 600 continues to step 610.

In step 608, the subscriber is denied access and method 600 exits. Step 608 can include sending the subscriber a message indicating why the session was not authorized.

In step 610, a session has been authorized and a usage breach probability is calculated. The usage breach probability represents the probability that the subscriber will breach his or her usage quota during the session. The usage breach probability can be based on any available information and network usage statistics at the time the session begins. For example, usage breach probability can be based on, but not limited to, the following information and network usage statistics: current date, the billing date, the number of breaches for the subscriber, the number of breaches for all subscribers, when breaches have occurred for the subscriber, when breaches have occurs for all subscribers, knowledge of peak usage patterns (e.g., on-peak/off-peak, weekdays), cumulative usage for the subscriber, and usage quota for the subscriber. Further, the following rules can be used to determine the usage breach probability: the probability of a quota breach increases towards the end of the billing period, the probability of a "repeat-offender" subscriber breaching a quota is significantly higher than the general subscriber population, a subscriber is more likely to breach when historic breaches have occurred, and breaches are more likely to occur peak at peak usage periods.

In step 612, the interim interval for the session is determined and a session time value is calculated based on the usage breach probability. The session time value creates a trigger for a subscriber to request reauthorization. Further, in an embodiment where there are multiple subscriber sessions occurring simultaneously, the usage breach probability of the subscriber can be compared to the usage breach probability of other subscribers with active sessions to determine the a session time value for the subscriber. This allows resources to be optimized by conserving resource to monitor the subscribers most likely to breach. It should be noted, that when a session time value is calculated based on the usage breach probability, the interim time interval can be based on either the usage breach probability or may be determined based on other information.

In step 614, an access accept message indicating the interim interval and the session time value is communicated.

In step 615, a determination is made if a request for reauthorization has been received. If a request for reauthorization has been received, method 600 continues to step 604 whether the subscriber is reauthorized using the same procedure as the initial authorization. A reauthorization allows steps 610 and 612 to be repeated. Thus, this allows a new usage breach probability to be calculated and a new interim interval and session time to be communicated.

In step 616, a usage update is collected. This usage update can be collected because the interim interval has elapsed or because the subscriber has ended the session.

In step 618, the usage breach probability is updated based on information received in the usage update. That is, the usage breach probability can be increased or decreased based on information contained in the usage update. For example, if the amount of usage in the current session is sufficiently high, the usage breach probability may increase.

In step 620, a determination is made as to the degree the usage data should be analyzed. The degree to which the usage data should be analyzed is based on the updated usage breach probability. For example, a new cumulative usage quota may be calculated if the usage breach probability exceeds a first threshold and the new cumulative usage total may be evaluated against the subscriber's usage quota if the usage breach probability exceeds a second threshold. Further, in an embodiment where there are multiple subscribers, each with active sessions occurring simultaneously, the usage breach probability of the subscriber can be compared to the usage breach probability of other subscribers with active sessions to optimize the level of analysis for all subscribers. In the exemplary embodiment, data is aggregated at step 620 and a determination is made is made whether the cumulative usage total should be evaluated against the usage quota. If it is determined that an evaluation should take place, method 600 continues to step 622. If it is determined that an evaluation is not necessary, method 600 continues to step 626.

In step 622, the cumulative usage total is evaluated against the subscriber's usage total and a determination is made as to whether a usage breach has occurred. In some instances, this may involve retrieving the usage quota from a database. If a breach has occurred, method 600 continues to step 624. If a breach has not occurred, method 600 continues to step 626.

In step 624, after it is determined that a breach has occurred, the appropriate breach action occurs. For example, a message can be sent to the subscriber indicating the breach (e.g., SMS), subscriber traffic can be redirected, the subscriber's session can terminate, a billing record may be generated, or any combination of the above actions can be performed. Further, the subscriber's service profile can be updated accordingly.

In step 626, a determination is made as to whether the update is a final update. If the update is a final update, method 600 continues to step 628. If the update is not a final update, method 600 continues to step 615.

In step 628, a subscriber session is ended and information in the subscriber's service profile is updated accordingly.

Figure 7:
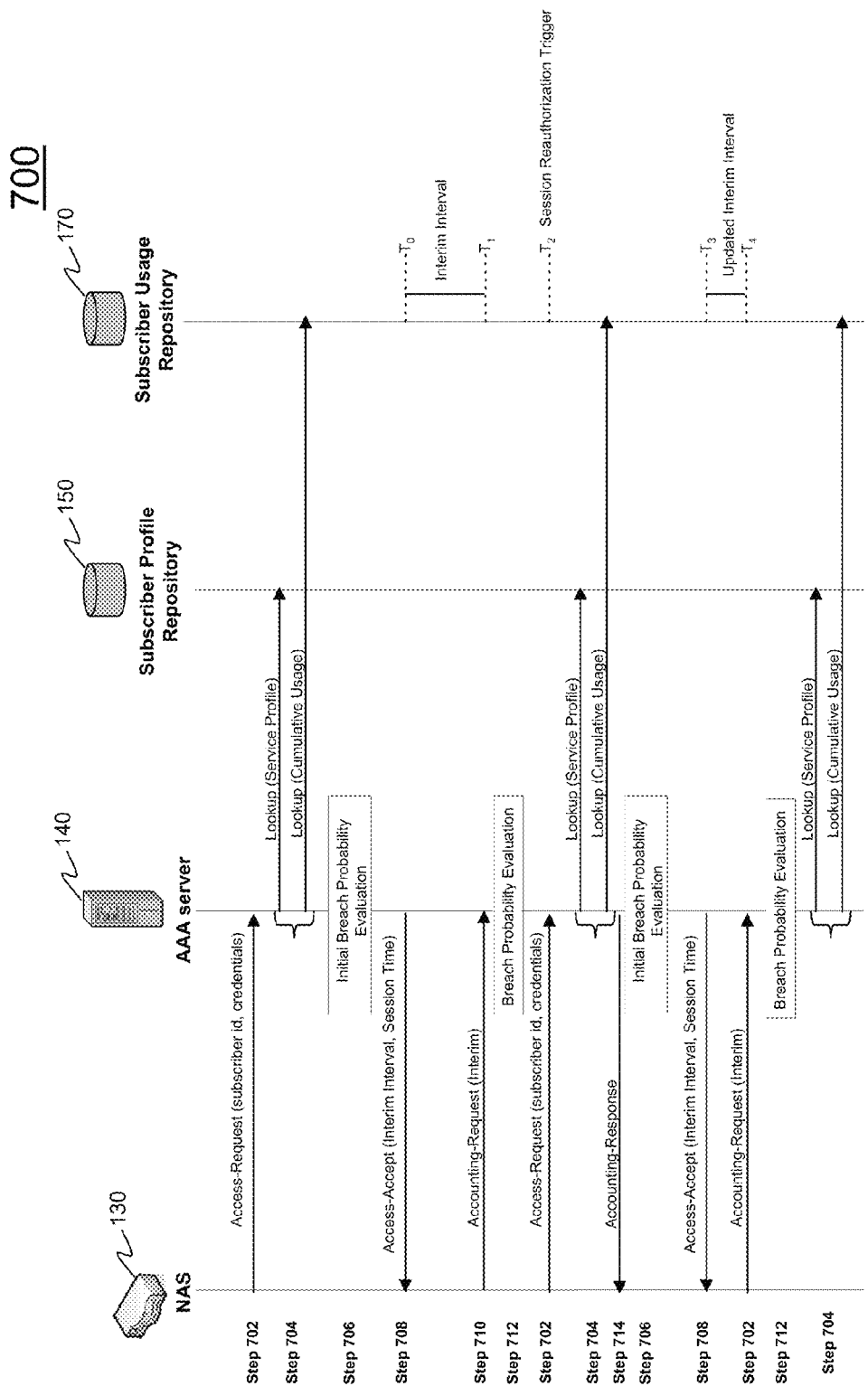
FIG. 7 provides an illustration of an embodiment of the present invention wherein the method provided in FIG. 5 is used within the RADIUS or Diameter protocol.

FIG. 7 provides an exemplary method 700 that illustrates the general method 600 being performed within the context of RADIUS or Diameter protocols. Reference is made to FIG. 2 for a general description of RADIUS or Diameter protocol implementations. The advantages of implementing method 600 in a RADIUS or Diameter protocol environment can be appreciated by comparing FIG. 7 to FIG. 2. FIG. 7 is similar to FIG. 5 and for the sake of brevity will not be described in detail. Reference is made to FIG. 5 for a description of steps that are not described.

FIG. 7 illustrates how a reauthorization trigger is utilized to shorten an interim interval.

In step 708, a Session Time AVP is included in the Access-Accept message. The Session Time AVP is used to trigger a session re-authorization.

At time $T_2$, when the Access-Request for re-authorization is received by AAA server 140, a new probability and interim interval calculation is performed. As shown in FIG. 7, the updated interim interval is shorter than the original interim interval. It should be noted that depending on the network device implementation, the session re-authorization may result in a brief service outage for the subscriber.

Figure 8:
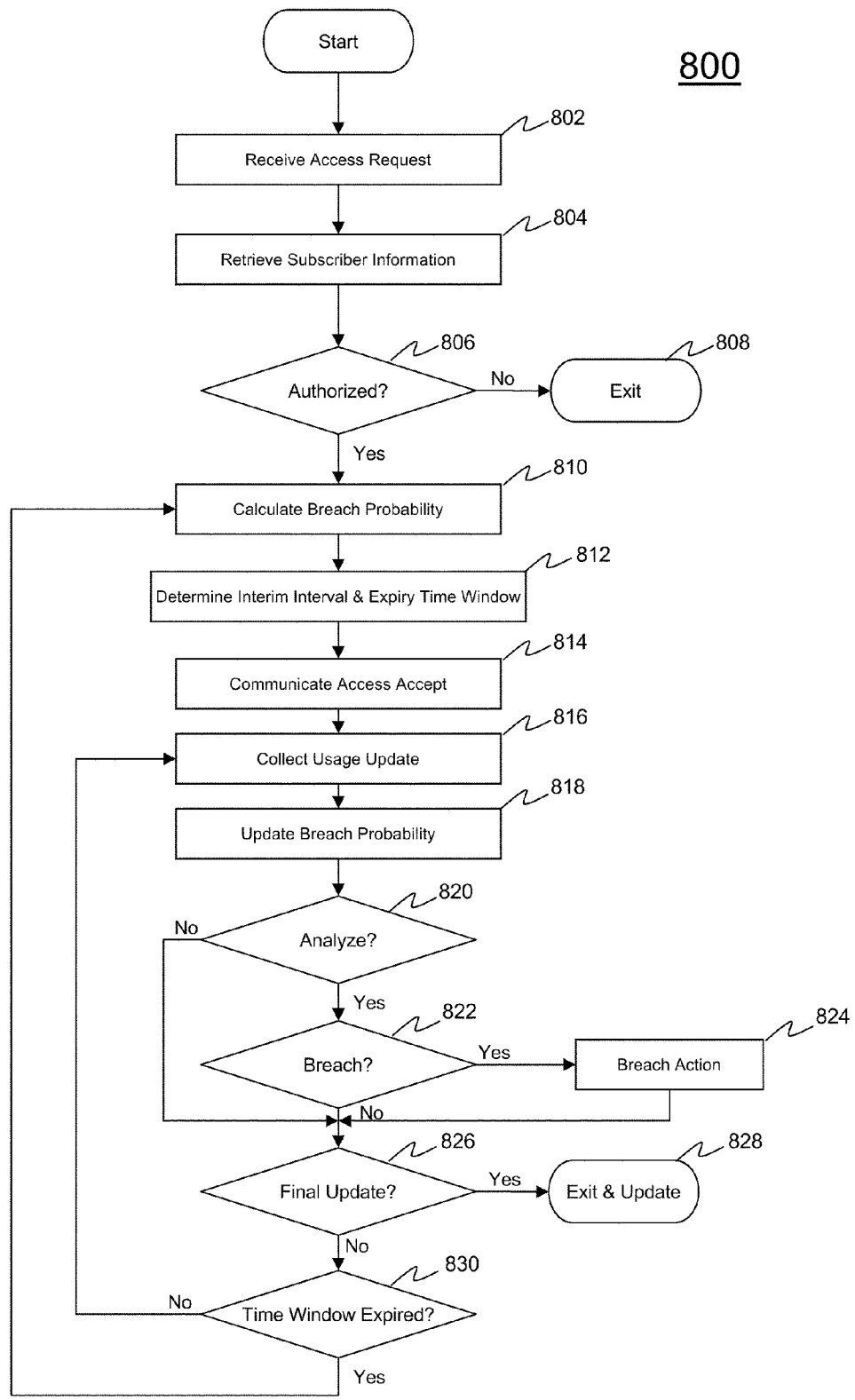
FIG. 8 provides a method for policing a subscriber's usage in accordance with the present invention.

FIG. 8 provides a method 800 that optimizes usage data collection and usage data analysis in accordance with the present invention. Method 800 starts at step 802.

In step 802, an access request message is received indicating that a subscriber would like a usage session to be authorized.

In step 804, the subscriber credentials and services profiles are retrieved. Step 804 may involve retrieving information from a database. In method 800, service profiles contain more detailed information about subscribers than service profiles described in the prior art. In addition to containing the subscriber's usage quota for the current billing cycle, service profiles contain information that allow calculation of the probability that the subscriber will breach his or her usage quota during the current session. This will be described in greater detail with respect to step 810.

In step 806, a determination is made to see if access is authorized. That is, the credentials checked to see if they are valid and a determination is made as to whether the subscriber has exceeded his or her usage quota. If access is not authorized, method 800 continues to step 808. If access is authorized, method 800 continues to step 810.

In step 808, the subscriber is denied access and method 800 exits. Step 808 can include sending the subscriber a message indicating why the session was not authorized.

In step 810, a session has been authorized and a usage breach probability is calculated. The usage breach probability represents the probability that the subscriber will breach his or her usage quota during the session. The usage breach probability can be based on any available information and network usage statistics at the time the session begins. For example, usage breach probability can be based on, but not limited to, the following information and network usage statistics: the current date, the billing date, the number of breaches for the subscriber, the number of breaches for all subscribers, when breaches have occurred for the subscriber, when breaches have occurred for all subscribers, knowledge of peak usage patterns (e.g., on-peak/off-peak, weekdays), cumulative usage for the subscriber, and usage quota for the subscriber. Further, the following rules can be used to determine the usage breach probability: the probability of a quota breach increases towards the end of the billing period, the probability of a 'repeat-offender' subscriber breaching a quota is significantly higher than the general subscriber population, a subscriber is more likely to breach when historic breaches have occurred, and breaches are more likely to occur peak at peak usage periods.

In step 812, the interim interval for the session is determined and an expiry time window is calculated based on the usage breach probability. The session expiry time window determines how long an interim interval is valid. Further, in an embodiment where there are multiple subscriber sessions occurring simultaneously, the usage breach probability of the subscriber can be compared to the usage breach probability of other subscribers with active sessions to determine an expiry time window for the subscriber. This allows resources to be optimized by using resources to monitor the subscribers most likely to breach. It should be noted, that when an expiry time window is calculated based on the usage breach probability, the interim time interval can be based on either the usage breach probability or may be determined based on other information.

In step 814, an access accept message indicating the interim interval and the session time value is communicated.

In step 816, a usage update is collected. This usage update can be collected because the interim interval has elapsed or because the subscriber has ended the session.

In step 818, the usage breach probability is updated based on information received in the usage update. That is, the usage breach probability can be increased or decreased based on information contained in the usage update. For example, if the amount of usage in the current session is sufficient, the usage breach probability may increase.

In step 820, a determination is made as to the degree the usage data should be analyzed. The degree to which the usage data should be analyzed is based on the updated usage breach probability. For example, a new cumulative usage total may be calculated if the usage breach probability exceeds a first threshold and the new cumulative usage total may be evaluated against the subscriber's usage quota if the usage breach probability exceeds a second threshold. Further, in an embodiment where there are multiple subscribers, each with active sessions occurring simultaneously, the usage breach probability of the subscriber can be compared to the usage breach probability of other subscribers with active sessions to optimize the level of analysis for all subscribers. In an exemplary embodiment, data is aggregated at step 820 and a determination is made whether the cumulative usage total should be evaluated against the usage quota. If it is determined that an evaluation should take place, method 800 continues to step 822. If it is determined that an evaluation is not necessary, method 800 continues to step 826.

In step 822, the cumulative usage total is evaluated against the subscriber's usage total and a determination is made as to whether a usage breach has occurred. In some instances, this may involve retrieving the usage quota from a database. If a breach has occurred, method 800 continues to step 824. If a breach has not occurred, method 800 continues to step 826.

In step 824, after it is determined that a breach has occurred, the appropriate breach action occurs. For example, a message can be sent to the subscriber indicating the breach (e.g., SMS), subscriber traffic can be redirected, the subscriber's session can terminate, a billing record may be generated, or any combination of the above actions can be performed. Further, the subscriber's service profile can be updated accordingly.

In step 826, a determination is made as to whether the update is a final update. If the update is a final update, method 800 continues to step 828. If the update is not a final update, method 800 continues to step 830.

In step 828, a subscriber session is ended and information in the subscriber's service profile is updated accordingly.

In step 830, a determination is made as to whether the time window has expired based on the time expiry window value. If the time window has not expired, method 800 continues to step 816. If the time window has expired, method 800 continues to step 810. Method 800 allows an interim interval to be updated based on updated breach probabilities without requiring session re-authorization.

Figure 9:
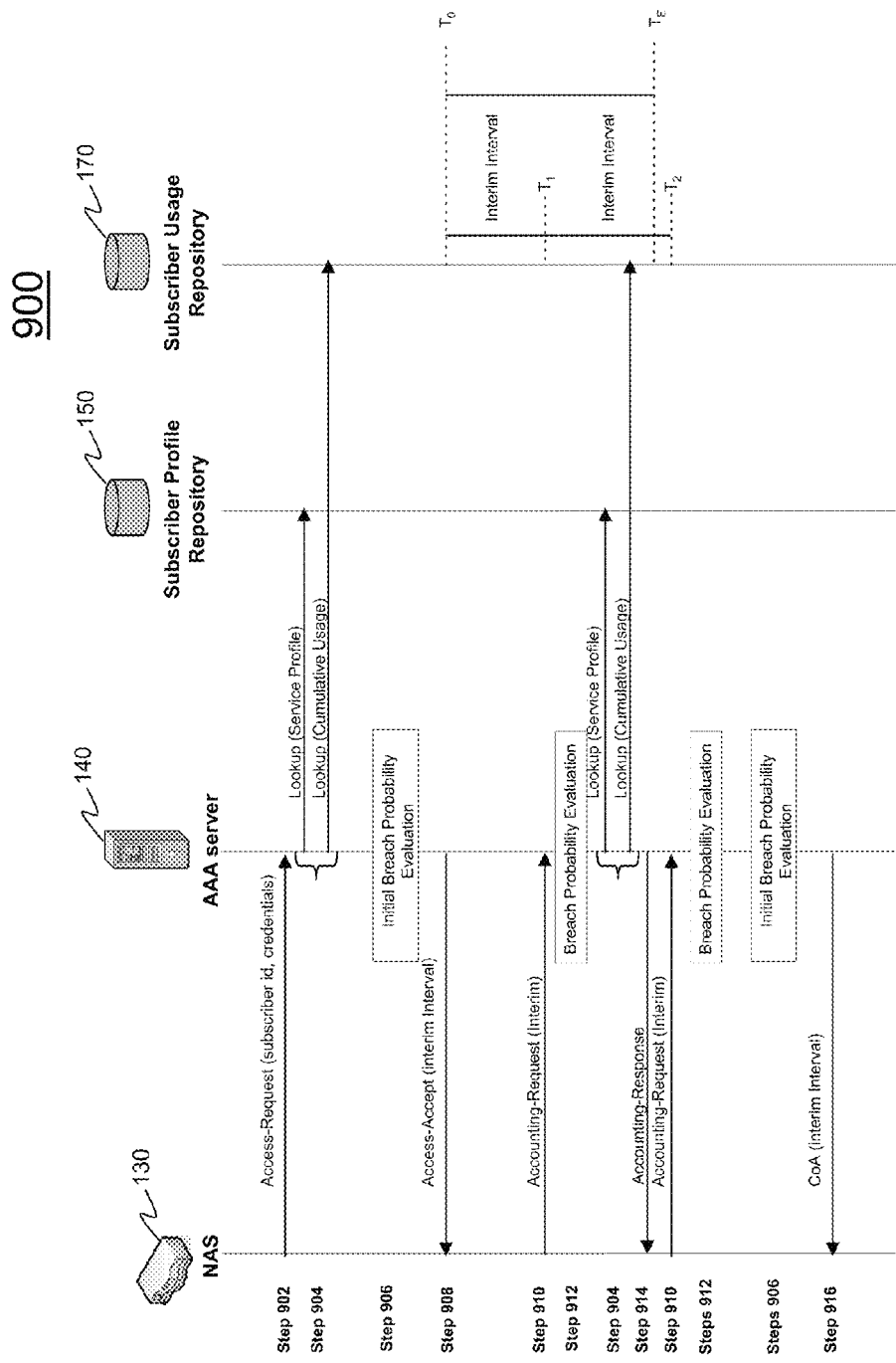
FIG. 9 provides an illustration of an embodiment of the present invention wherein the method provided in FIG. 7 is used within the RADIUS or Diameter protocol.

FIG. 9 provides an exemplary method 900 illustrating the general method 800 performed within the context of RADIUS or Diameter protocols. Reference is made to FIG. 2 for a general description of RADIUS or Diameter protocol implementations. The advantages of implementing method 800 in a RADIUS or Diameter protocol environment can be appreciated by comparing FIG. 9 to FIG. 2. FIG. 9 is similar to FIGS. 5 and 7 and for the sake of brevity will not be described in detail. Reference is made to FIGS. 5 and 7 for a description of steps that are not described.

In FIG. 9 AAA server 140 provides a probability expiry time window with the usage breach probability in the Class AVP. When the interim usage in received, the probability expiry time is checked to see if it has expired. If it has expired (shown at $T_E$ in FIG. 9), a new usage breach probability, new validity time window, and a new interim interval are calculated.

In step 916, a Change of Authorization (CoA) message is sent to the network access server 130 with a new interim interval. It should be noted that the implementation of FIG. 9 is dependent on network access server 130 implementation and CoA handling of the Class attribute.

Any step from methods 300, 600, and 800 can be used in combination with any of methods 300, 600, and 800 without departing from the scope of the present invention.

Furthermore, methods 300, 600, and 800 can be incorporated into any product that includes a usage metering function.

Computer System Implementation

Figure 10:
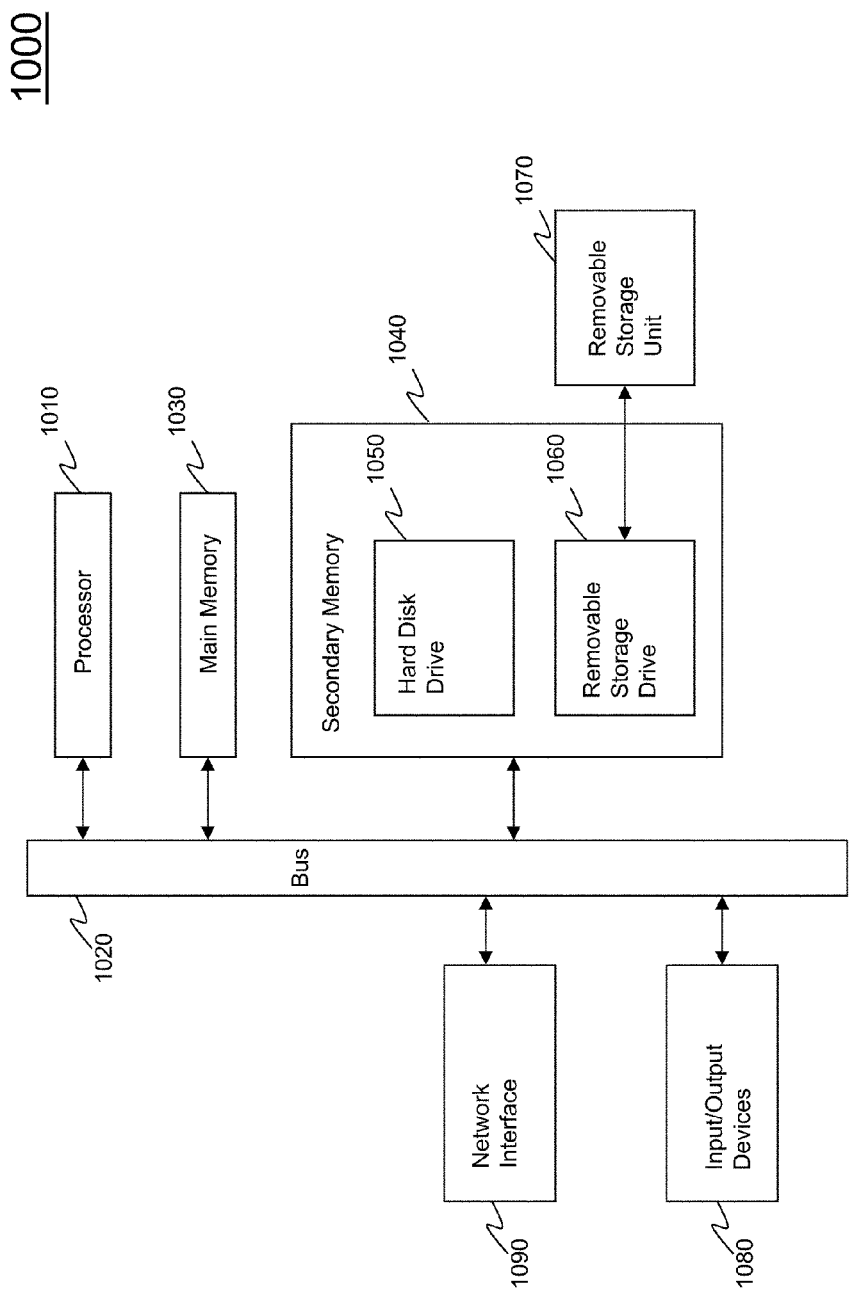
FIG. 10 is a diagram of a computer system on which the methods and systems herein described can be implemented, according to an embodiment of the invention.

In an embodiment of the present invention, the methods and systems of the present invention described herein are implemented using well known computers, such as a computer 1000 shown in FIG. 10. The computer 1000 can be any commercially available and well known computer capable of performing the functions described herein, such as computers available from International Business Machines, Apple, Sun, HP, Dell, Cray, etc.

Computer 1000 includes one or more processors (also called central processing units, or CPUs), such as processor 1010. Processor 1000 is connected to communication bus 1020. Computer 1000 also includes a main or primary memory 1030, preferably random access memory (RAM). Primary memory 1030 has stored therein control logic (computer software), and data.

Computer 1000 may also include one or more secondary storage devices 1040. Secondary storage devices 1040 include, for example, hard disk drive 1050 and/or removable storage device or drive 1060. Removable storage drive 1060 represents a floppy disk drive, a magnetic tape drive, a compact disk drive, an optical storage device, tape backup, ZIP drive, JAZZ drive, etc.

Removable storage drive 1060 interacts with removable storage unit 1070. As will be appreciated, removable storage unit 1060 includes a computer usable or readable storage medium having stored therein computer software (control logic) and/or data. Removable storage drive 1060 reads from and/or writes to the removable storage unit 1070 in a well known manner.

Removable storage unit 1070, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 1000, or multiple computer 1000s to perform any combination of the functions described herein Computer programs (also called computer control logic) are stored in main memory 1030 and/or the secondary storage devices 1040. Such computer programs, when executed, direct computer 1000 to perform the functions of the present invention as discussed herein. In particular, the computer programs, when executed, enable processor 1010 to perform the functions of the present invention. Accordingly, such computer programs represent controllers of the computer 1000.

Computer 1000 also includes input/output/display devices 1080, such as monitors, keyboards, pointing devices, etc.

Computer 1000 further includes a communication or network interface 1090. Network interface 1090 enables computer 1000 to communicate with remote devices. For example, network interface 1090 allows computer 1000 to communicate over communication networks, such as LANs, WANs, the Internet, etc. Network interface 1090 may interface with remote sites or networks via wired or wireless connections. Computer 1000 receives data and/or computer programs via network interface 1090. The electrical/magnetic signals having contained therein data and/or computer programs received or transmitted by the computer 1000 via interface 1090 also represent computer program product(s).

The invention can work with software, hardware, and operating system implementations other than those described herein. Any software, hardware, and operating system implementations suitable for performing the functions described herein can be used.

Conclusion

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A method for policing a usage total of a subscriber at a server to determine a level of processing for subscriber usage updates during a usage session, comprising:
   determining a usage breach probability at the server, wherein the usage breach probability represents a probability that the subscriber will breach a usage quota during the usage session;
   determining at the server an interim interval at which subscriber usage updates are collected based at least in part on the usage breach probability;
   collecting by the server a subscriber usage update; and
   determining by the server a type of processing for the subscriber usage update based upon an analysis of the usage breach probability, wherein when the usage breach probability exceeds a first threshold, updating the subscriber usage total,
   when the usage breach probability exceeds a second threshold evaluating the subscriber usage total against a usage quota, or when the usage breach probability exceeds one or more other thresholds, determining the type of processing for the subscriber usage update based on one or more other thresholds that have been exceeded by the usage breach probability.

2. The method according to claim 1, further comprising:
   determining a session time value that indicates when reauthorization is required based at least in part on the usage breach probability.

3. The method according to claim 1, further comprising:
   determining a time value that indicates when the interim interval will be updated, based at least in part on the usage breach probability.

4. The method according to claim 3, further comprising:
   communicating an updated interim interval using a change of authorization message.

5. The method according to claim 1, further comprising:
   updating the usage breach probability based at least in part on the subscriber usage update.

6. The method according to claim 1, wherein determining a usage breach probability includes using at least in part any one or more of current date, billing date, number of breaches for the subscriber, number of breaches for all subscribers, when breaches have occurred for the subscriber, when breaches have occurred for all subscribers, knowledge of peak usage patterns, cumulative usage for the subscriber, and usage quota for the subscriber.

7. The method according to claim 1, wherein determining a usage breach probability includes using at least in part any one or more dynamic factors.

8. The method according to claim 7, wherein the using at least in part any one or more dynamic factors includes using at least in part any one or more of a type of service being provided to the subscriber, a usage total by the subscriber, a location of use by the subscriber, and a time of day.

9. The method according to claim 1, wherein determining a usage breach probability includes using at least in part any one or more static factors.

10. The method according to claim 9, wherein the using at least in part any one or more static factors includes using at least in part any one or more of a subscriber profile.

11. The method according to claim 1, wherein determining a usage breach probability includes using at least in part any one or more of a heuristic approach, a regression analysis, and an analysis of variance approach.

12. The method according to claim 1, wherein determining a usage breach probability includes choosing a calculation method based on a confidence level in the calculation method.

13. The method according to claim 1, further comprising:
generating a marketing message if the usage breach probability exceeds a marketing threshold.

14. A system for policing a usage total of a subscriber to determine a level of processing for subscriber usage updates, comprising:
a breach probability calculation module adapted to determine a usage breach probability, wherein the usage breach probability represents a probability that the subscriber will breach a usage quota during the usage session;
a breach analysis module adapted to receive a subscriber usage update and analyze subscriber usage data based in part on the usage breach probability including determining a type of processing for the subscriber usage update based upon an analysis of the usage breach probability, wherein when the usage breach probability exceeds a first threshold, updating the subscriber usage total, when the usage breach probability exceeds a second threshold evaluating the subscriber usage total against a usage quota, or when the usage breach probability exceeds one or more other thresholds, determining the type of processing for the subscriber usage update based on one or more other thresholds that have been exceeded by the usage breach probability;
a usage update interval module adapted to determine an interim interval at which subscriber usage updates are collected based at least in part on the usage breach probability; and
a network provider interface adapted to communicate with network provider facilities, upon which subscriber usage updates are received.

15. The system according to claim 14, wherein the breach analysis module is further adapted to:
determine a session time value that indicates when reauthorization is required based at least in part on the usage breach probability.

16. The system according to claim 14, wherein the breach analysis module is further adapted to:
determine a time value that indicates when the interim interval will be updated, based at least in part on the usage breach probability.

17. The system according to claim 14, wherein the breach analysis module is further adapted to:
communicate an updated interim interval via the network provider interface using a change of authorization message.

18. The system according to claim 14, wherein the network provider interface is coupled to a user interface.

19. The system according to claim 14, wherein the breach probability calculation module is further adapted to:
update the usage breach probability based at least in part on a subscriber usage update.

20. The system according to claim 14, wherein the breach probability calculation module is further adapted to determine a usage breach probability based at least in part on any one or more of current date, billing date, number of breaches for the subscriber, number of breaches for all subscribers, when breaches have occurred for the subscriber, when breaches have occurs for all subscribers, knowledge of peak usage patterns, cumulative usage for the subscriber, and usage quota for the subscriber.

21. The system according to claim 14, wherein the network provider interface is adapted to communicate according to at least one of RADIUS and Diameter protocols.

22. The system according to claim 21, wherein the network provider interface is further adapted to communicate the interim interval in an access accept message.

23. The system according to claim 21, wherein the breach analysis module is further adapted to determine a session time value that indicates when reauthorization is required based at least in part on the usage breach probability, and communicate the session time value in an access accept message.

24. The system according to claim 21, wherein the network provider interface module is further adapted to communicate an updated interim interval in a change of authorization message.

25. The system according to claim 21, wherein the breach probability calculation module is further adapted to update the usage breach probability based at least in part on a subscriber usage update received in an accounting request message via the network provider interface.

26. The system according to claim 21, wherein the breach analysis module is a server that communicates with a network access server via the network provider interface.

27. The system according to claim 14, further comprising:
a marketing system interface coupled to the breach probability calculation module and adapted to output a marketing message if the usage breach probability exceeds a market threshold.

28. The system according to claim 14, further comprising:
a subscriber profile interface adapted to interface with a subscriber profile repository; and
a subscriber usage interface adapted to interface with a subscriber usage repository.

* * * * *

UNITED STATES PATENT AND TRADEMARK OFFICE
CERTIFICATE OF CORRECTION

| | | |
|---|---|---|
| PATENT NO. | : 8,055,237 B2 | Page 1 of 1 |
| APPLICATION NO. | : 12/186831 | |
| DATED | : November 8, 2011 | |
| INVENTOR(S) | : Jones et al. | |

It is certified that error appears in the above-identified patent and that said Letters Patent is hereby corrected as shown below:

Claim 20:
        col. 20, line 11; please replace "occurs" with --occurred--.

Signed and Sealed this

Fourteenth Day of August, 2012

David J. Kappos
*Director of the United States Patent and Trademark Office*